March 2, 1926.
B. W. THURTELL
VALVE
Filed April 20, 1925
1,574,767
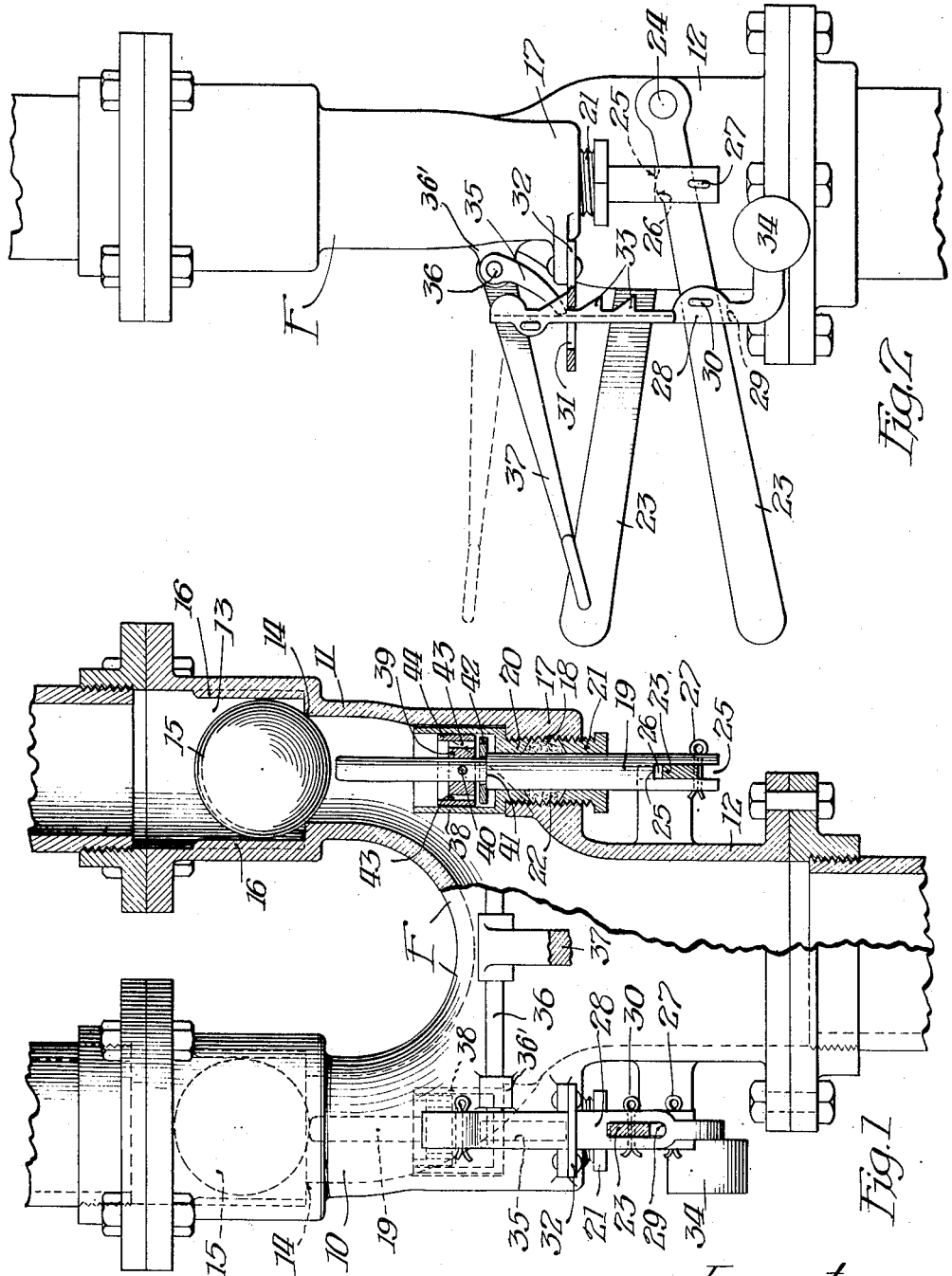
Inventor:
Benjamin W. Thurtell,
by Brown, Boettcher + Dienner,
Attys.

Patented Mar. 2, 1926.

1,574,767

UNITED STATES PATENT OFFICE.

BENJAMIN W. THURTELL, OF CHICAGO, ILLINOIS.

VALVE.

Application filed April 20, 1925. Serial No. 24,338.

*To all whom it may concern:*

Be it known that I, BENJAMIN W. THURTELL, a citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

My invention relates to valve structures in which a heavy valve member, usually in the form of a metal ball is used to control the flow of fluid, the ball being drawn to and held against its seat by the force of gravity and the pressure of the fluid. Means are provided for raising the valve member to any degree from its seat when flow is desired, but if such means is too suddenly released the valve member will be forcibly swung against its seat, and such continuous pounding will soon cause the seat to become defective and leakage will result. One of the important objects of my invention is to provide improved means for retarding and softening the closure movement of the valve member, so that no matter how fast it is released, it will be restrained in its closure movement and will slowly and quietly seat itself into closed position.

Another important object of the invention is to provide improved means for moving each of a number of valve members to open position and for locking them in such position, together with means for simultaneously releasing all of the valve members, so that they may close.

The various features of my invention are incorporated in the structure shown in the drawings, in which:

Figure 1 is a front elevational view, partly in section; and

Fig. 2 is a side elevational view.

The valve structure shown is of particular utility for laundry use for controlling the flow of hot and cold water. The valve structure frame F is Y-shaped having the valve frame legs 10 and 11, which lead to the trunk or outlet pipe 12. The valve arrangement in each branch is the same, each having a valve chamber 13 with an annular valve seat 14 for a spherical ball valve 15. Along the sides of the valve chamber guide ribs 16 extend longitudinally for restraining the valve ball to vertical movement, with only sufficient clearance to prevent friction, the water flowing between the ribs when the valve is open.

Below each valve chamber the frame has the enlargement 17 provided with the threaded vertical pasageways 18 for the valve operating stem 19. In the upper end of each passageway is a guide plug 20 and in the lower end a gland plug 21, the stuffing space between the plugs being filled with stuffing material 22, the stem 19 extending through and being slidable in the plugs. In closed position the stem extends to within a short distance of the associated valve ball, so as to permit the ball to fully and accurately seat. When the stem is raised the ball is lifted from its seat and fluid will flow past the ball and to the outlet pipe 12.

For each valve lifting stem I provide an operating lever 23, pivoted at its inner end on a pin 24 extending from the frame, and in advance of such pivot connection extending through a slot 25 in the lower end of the stem, so that when the outer end of the lever is raised the stem will be raised. To reduce friction a rounded projection 26 is provided on the lever for abutting against the upper wall of the slot 25, as shown in Fig. 2, and a cotter pin 27 is inserted through the stem below the lever which serves as an abutment for the lever, when the lever is swung down to lower the stem.

Means are provided for automatically locking the lever in raised position to hold the valve open. An L-shaped latch fitting 28 has the opening 29 in its vertical limb through which the operating lever 23 extends, the pin 30 pivoting the latch fitting to the lever. The fitting extends upwardly through the opening 31 in the latch plate 32 secured to and extending from the frame F, and along the inner side of the fitting are the latch teeth 33 adapted to seat against the upper surface of the latch plate to lock the fitting in any position to which it has been raised by the operating lever. The rearwardly extending horizontal limb of the latch fitting has a weight 34 applied thereto, which tends to swing the fitting to latching engagement with the latch plate, so that when the operating lever is raised the latch teeth 33 will glide past the latch plate ready to be swung over the top of the latch plate to thus lock the lever in upper position as soon as it is released. Each of a number of valves may thus be quickly opened to any desired degree by raising its operating lever, and each valve will then be held in open position by its latching mechanism.

For unlatching the latching mechanism to permit all the valves to close, I provide release fingers 35 on a shaft 36 extending across the frame end behind the latch fitting, and journalled in lugs 36' on the frame. An arm 37 extends forwardly from the shaft by which it may be rotated. Normally the arm is down and with the latch fingers swung downwardly out of the latching path of the latch fittings. However, when the arm 37 is raised, the fingers are swung upwardly and against the latch fittings and the fittings are swung and held with their teeth away from the latch plate, so that the fittings can then move downwardly through their respective openings 31 to permit the operating levers 23 to swing down and to draw down the stems 19 away from the valve balls, so that they may re-seat to closed position. The weight 34, together with the weight of the operating lever, will tend to quickly draw down the valve stem. After the valves are closed, the release arm 37 is moved to its normal position. In practice, the arm 37 can be controlled by a float arrangement, so that when the proper amount of fluid has been drawn through the valve structure it will be automatically closed upon release of the latch members.

As before explained, sufficient weight is provided for causing the stems 19 to drop to normal valve releasing position when the latching mechanism has been unlatched. If the stems are permitted to return too rapidly, the valve balls due to their own weight and the pressure of the fluid, will be swung rapidly and with great force against their seats, and such pounding would soon destroy the seats and leakage would result. To avoid this, I provide a dash pot mechanism for each stem. Each dash pot mechanism comprises a cylinder 38 which may be an integral part of the guide plug 20. In each cylinder is a piston 39 which is secured to the corresponding stem 19 by a pin 40, the stem extending axially through the cylinder. The upper end of each stem 19 is of reduced diameter, as shown, in order to provide a seating shoulder 41 for a valve disc 42 which surrounds the stem a short distance below the piston, and through the piston are a number of fluid passageways 43 which are exposed to flow when the valve is down and on its supporting shoulder, but which are closed when the valve is raised to engage against the underside of the piston.

In operation, when the operating lever is raised the corresponding stem will be shifted upwardly and with it the associated piston in its cylinder, and air or fluid above the piston may readily travel through the passageways 43 to the opposite side and past the valve disc 42, so that there is no resistance to rapid upward movement of the stem to move the ball valve from its seat. However, should the stem, after unlocking of its latch mechanism, tend to move too rapidly downwardly, the pressure against the bottom of the valve disc will raise it against the piston to close the passageways 43, and then the fluid in the bottom of the cylinder can escape only through the restricted passageway 44. This restricted passageway may be provided by leaving a slight clearance between the piston and the cylinder wall, or by grooving the piston or the cylinder wall. The resistance to the fluid flow past the piston will, therefore, retard the downward movement of the stem, and the corresponding valve ball will slowly move to re-seating position and all pounding of the valve seat and consequent noise will be eliminated, and the valve seat will retain its perfect seating surface and the valve ball will retain its perfect spherical shape and leakage will be impossible. By having the dash pot mechanism within the valve frame and directly around the stem, such mechanism will be protected and will always be uniformly lubricated by the fluid.

Having described my invention and its various features of construction, arrangement, and operation, I claim as follows:

1. In a valve structure, the combination of a plurality of valve members, actuating stems for said valve members, an actuating lever for each stem, latch mechanism for each lever for locking it in valve opening position, and a common means for releasing said latch mechanisms, thereby permitting closure movement of said valve members.

2. In valve mechanism, the combination of a frame, a plurality of valve seats in said frame and a valve for each seat, actuating means for each valve, a toothed latch fitting for each actuating means and a latch plate on said frame for co-operating with said fitting to lock said actuating means in valve opening position, and a common trip mechanism for simultaneously disengaging said latch fittings and latch plate to thereby permit simultaneous closure of said valve.

3. In a valve structure, the combination of a plurality of valve members, means for independently opening said valve members, locking mechanism for each valve member for locking it in open position, and a common means for actuating said locking mechanisms to simultaneously release all said valve members.

4. In a valve structure having a plurality of passageways, a valve for each passageway, independent means for opening each valve, independent locking means for locking each valve in open position, common releasing means for said locking means whereby said valves may simultaneously close, and means associated with each valve for cushioning the closing movement thereof.

5. In a valve structure, the combination of a plurality of valve members, means for independently opening each valve member to any degree desired, means for locking each valve member in its open position, and a common means for simultaneously unlocking all of said locking mechanisms whereby said valve members may move together to closed positions.

6. In a valve structure, the combination of a plurality of valve members, means for independently opening any number of such valve members to any degree desired, independent locking mechanism for each member for locking it in its open position, and a common means for releasing the locking mechanisms of the open valve members, whereby said members may simultaneously return to closed positions.

In witness whereof, I hereunto subscribe my name this 15th day of April, 1925.

BENJAMIN W. THURTELL.